United States Patent [19]
de Wit et al.

[11] 3,896,397
[45] July 22, 1975

[54] ACOUSTO-OPTICALLY Q-SWITCHED LASER

[75] Inventors: Michiel de Wit, Dallas; Roddy Fro Hotz, Richardson, both of Tex.

[73] Assignee: Texas Instruments Incorporated, Dallas, Tex.

[22] Filed: Dec. 12, 1973

[21] Appl. No.: 424,115

[52] U.S. Cl. .......................................... 331/94.5 Q
[51] Int. Cl. ............................................. H01s 3/11
[58] Field of Search ............ 331/94.5; 350/160, 161

[56] References Cited
UNITED STATES PATENTS
3,297,876  1/1967  De Maria ....................... 331/94.5 Q
3,725,812  4/1973  Scott .............................. 331/94.5 Q Primary Examiner—William L. Sikes
Attorney, Agent, or Firm—Harold Levine; James T. Comfort; William E. Hiller

[57] ABSTRACT

An improved acousto-optically Q-switched laser is disclosed. Introducing acoustic energy into the Q-switch from the side away from the pumping flashlamp significantly improves the multiple-pulse limit for the laser. In a second aspect of the invention, a combination of corner-cube and Porro prism retro-reflectors permits three of the four mounting adjustments to be of loose tolerance.

8 Claims, 4 Drawing Figures

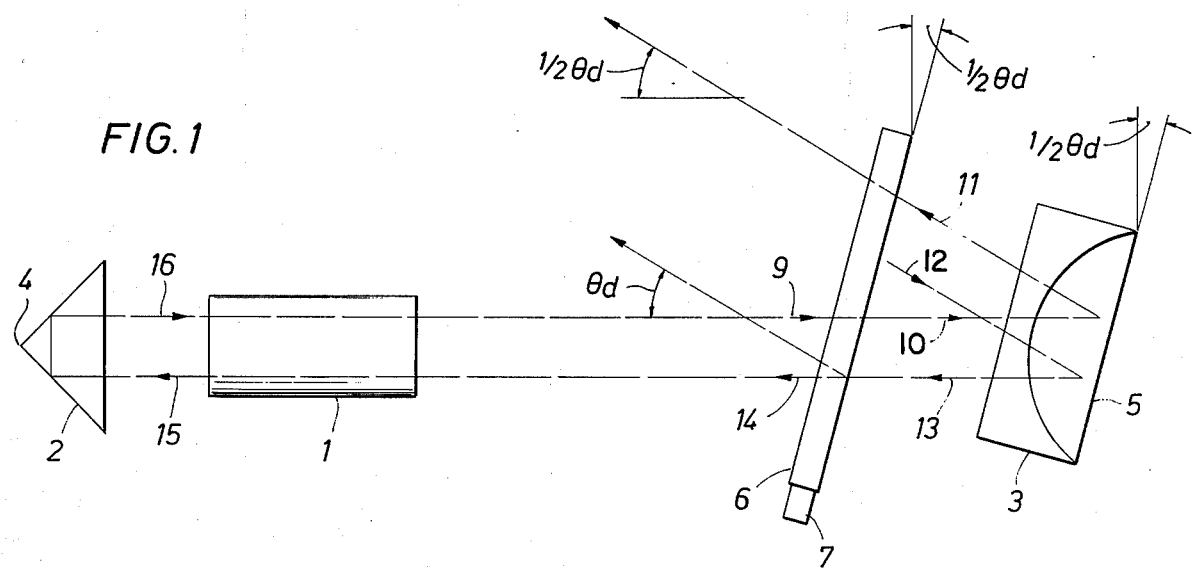
FIG. 1
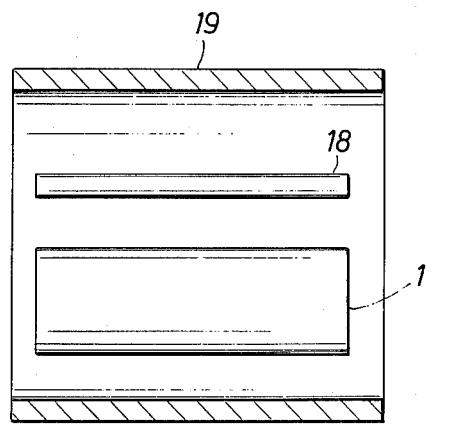
FIG. 2
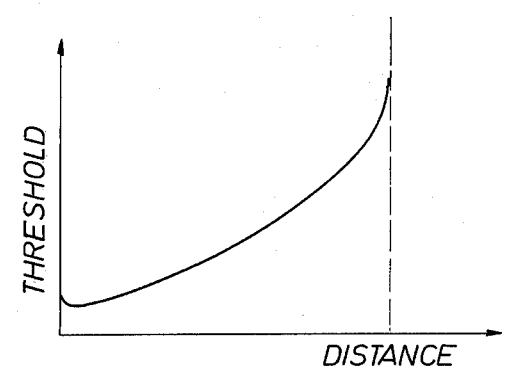
FIG. 3
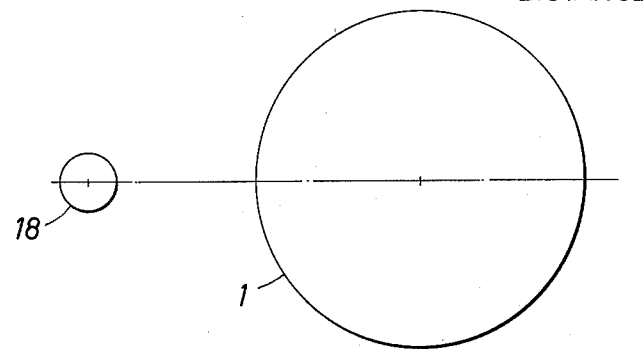

TABLE 1

| ARRANGEMENT # | REFL. 2 | REFL. 3 | TOLERANCE FOR REFL. 2 | | TOLERANCE FOR REFL. 3 | |
|---|---|---|---|---|---|---|
| | | | HORIZ. | VERT. | HORIZ. | VERT. |
| 1 | F | F | 0.4 | 0.4 | 1.4 | 1.3 |
| 2 | PV | F | 10 | 0.4 | 2 | 0.9 |
| 3 | F | PV | 6 | 0.7 | 24 | 1 |
| 4 | F | PH | LONG - PULSE OPERATION | | | |
| 5 | PV | PV | 13 | 0.6 | 17 | 0.5 |
| 6 | PH | PV (SHORT) | 4 | 47 | 27 | 2 |
| 7 | PH | PV (LONG) | 5 | 59 | 22 | 2 |
| 8 | CC | PV | 25 | 25 | 15 | 2 |

3,896,397

ACOUSTO-OPTICALLY Q-SWITCHED LASER

FIELD OF THE INVENTION

This invention relates to lasers, and more particularly to acousto-optically Q-switched lasers.

BACKGROUND OF THE INVENTION

Since the advent of an acousto-optically Q-switched laser, as described in U.S. Pat. No. 3,725,812 to Warner C. Scott, there has been significant interest in improving such lasers, especially with regard to increasing the energy content in a single-pulse output. That is, every time the Q-switch is turned on, it is desired to extract as much energy as possible in a single laser output pulse.

For practical applications, it is also desirable to maximize the tolerances for mounting the reflector elements in the laser resonator cavity.

Accordingly, it is a feature of the present invention to provide an acousto-optically Q-switched laser with increased single-output-pulse energy.

It is another feature of the present invention to maximize the tolerances at which the optical reflector elements of the laser may be mounted.

Further features and advantages of the invention will be apparent to persons skilled in the art, from a consideration of this specification, including the claims and the drawings.

SUMMARY OF THE INVENTION

In accordance with the present invention, a specific direction of propagation of acoustical energy is chosen. This direction is opposite to the population inversion density gradient in the laser medium. It is found that this direction of propagation of acoustical energy produces a significantly higher multiple-pulse limit than either a differently directed acoustic wave, or an acoustical energy excited with an RF pulse of faster rise time.

In a second aspect of the invention, it has been determined that a particular combination of retroreflectors permits advantageous loose angular tolerances for adjusting reflector mountings.

There are four possible adjustments: first reflector vertical, first reflector horizontal, second reflector vertical and second reflector horizontal. It is found according to the present invention that if the reflecting element near the laser rod is a corner cube, and the feedback reflector (the one located near the acousto-optic Q-switch element) is a Porro prism, only a single close-tolerance angular adjustment of the reflectors need be made. Other combinations of possible types of reflectors result in a requirement of at least two close-tolerance mountings.

BRIEF DESCRIPTION OF THE DRAWINGS

FIG. 1 is a side view of part of a Q-switched laser system.

FIG. 2 is also a side view of part of a laser system, illustrating different parts, according to the present invention.

FIG. 3 is a representation of lasing threshold variation across a laser rod with a non-uniform population inversion density.

Figure 4:
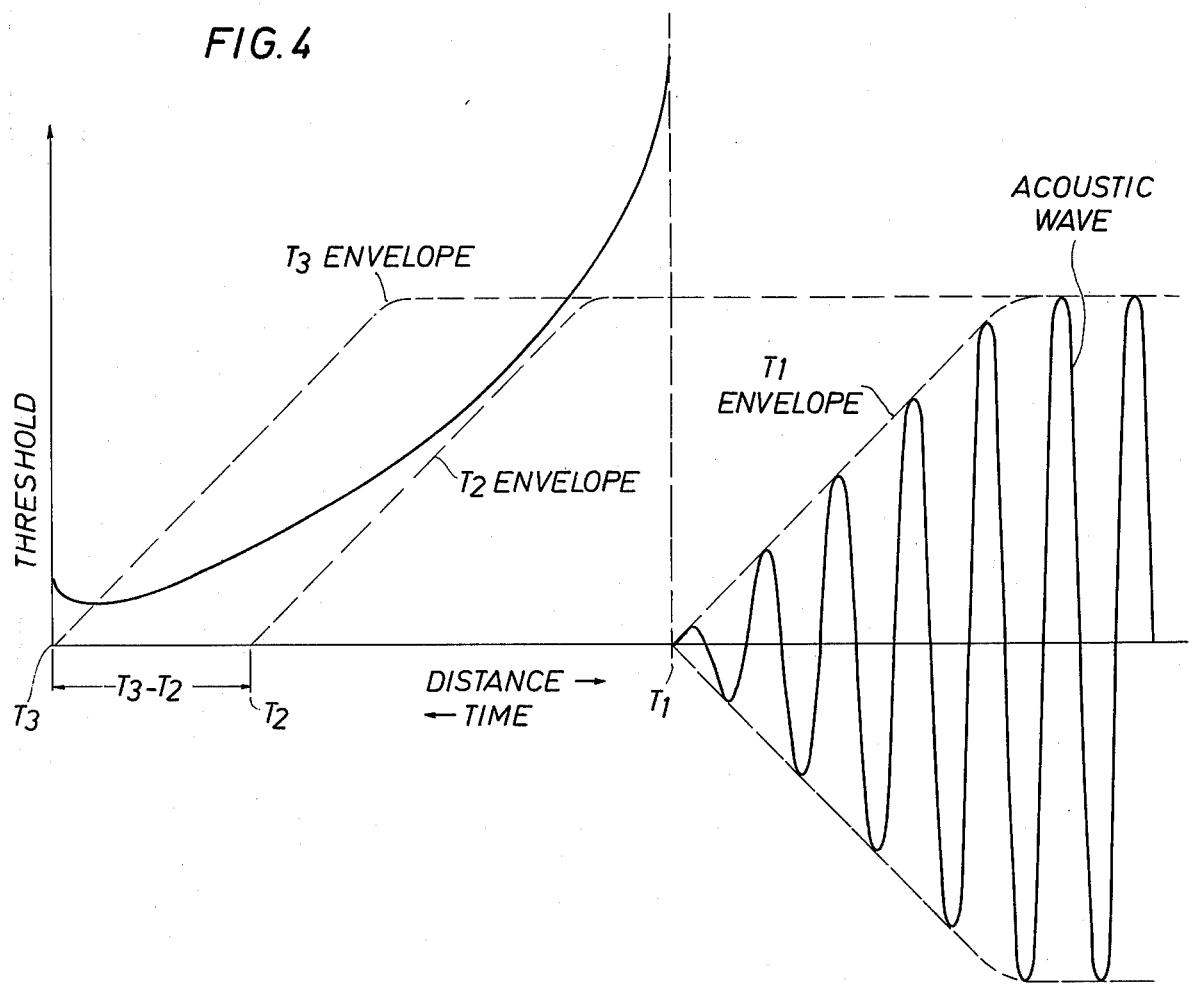
FIG. 4 is a representation of the lasing threshold across a laser rod with a non-uniform population inversion density, and of an acoustical wave for Q-switching the laser resonator.

Table 1 is a chart of angular tolerances with various reflector arrangements, illustrating the advantages of selecting reflectors in accordance with this specification.

DETAILED DESCRIPTION

Referring now to FIG. 1 of the drawings, the principal elements of a Q-switched laser system are shown. A rod 1 of lasing material, for example, YA1G:Nd, is shown mounted between two reflectors 2 and 3. Reflector 2 is a Porro prism with its apex 4 lying in a plane perpendicular to the plane of the drawing. Reflector 3 is also a Porro prism, but with its apex 5 lying in the plane of the drawing.

Between the laser rod 1 and the reflector 3 is an acousto-optic Q-switch 6, driven by a transducer 7, which applies acoustic energy to the switch. It should be understood that the configuration of the Q-switch 6 and the transducer 7 is shown here for illustrative purposes only, and that in practice the transducer is typically longer in the direction of the lasing radiation path than it is high.

When the Q-switch is off, due to non-energization of the acousto-optic Q-switch 6 by the transducer 7, radiation emanating from the laser rod 1 will pass in an essentially straight line through the acousto-optic switch 6, and will be reflected out of the feedback loop by the tilted reflector 3. It will be noted that the tilting of acousto-optic element 6 serves to prevent undesired lasing action through direct reflection back into the rod from the surface of the acousto-optic element 6. The tilting of both the acousto-optic element 6 and the reflector 3 is shown exaggeratedly large, and would in practice be typically only about ¼° from the vertical. This corresponds to one-half the deflection angle $\theta_d$ for Bragg diffraction in fused quartz with a 50 MH$_z$ acoustic frequency.

When the transducer 7 is energized, an acoustic wave propagates across the acousto-optic switch 6, and the radiation paths may be traced as shown in FIG. 1.

Assume photons emitted by the laser rod 1 are moving along raypath 9. If the acousto-optic switch 6 is "off," due to non-energization by transducer 6, the photons will follow path 10, and be reflected by reflector 3, along raypath 11, thus passing out of the system.

If, however, the switch 6 is "on," some of the photons will be deflected by an angle $\theta_d$ and follow raypath 12, while others will follow path 10 as before, and pass into output.

The photons following path 12 will be reflected out along raypath 13, which, due to the ¼ $\theta_d$ tilt of reflector 3, will be parallel to the original raypath 9. Upon reaching the switch 6, some of these photons will pass straight through, as feedback to the laser rod 1, along raypath 14. In the laser rod, these photons cause stimulated emission of radiation, multiplying the number of photons to emerge along path 15. These multiplied photons are reflected back again into the rod by reflector 2, along path 16, where they are again muliplied.

Returning now to raypath 13, some of these photons will be deflected upward by switch 6, through an angle $\theta_d$, and hence pass into output.

Due to the exaggeratedly large deflection angles used for illustration in FIG. 1, a second possible feedback path, due to Bragg deflection downward of some photons in raypath 11, is not shown in the drawing. This feedback path would be horizontal back to the rod 1.

Thus, there is no lost energy, except possibly that coming from the upper fringe area of the rod. All energy passes into either output or feedback, and only two reflectors are used, as opposed to the three disclosed in the above-mentioned Scott patent.

It should be understood, in this aspect of the invention, that the crossed Porro prisms 2 and 3 need not be in the crossed position shown, and could be replaced by other retro-reflectors, such as corner cubes for reflector 2, or by flat mirrors. However, if a Porro prism is to be used for reflector 2, it is especially advantageous to mount it as above described, with its apex horizontal. This permits a folding action, which halves the effective transit time of the acoustic wavefront.

Referring now to FIG. 2 of the drawings, there is shown a side view of part of a laser system similar to that of FIG. 1, with the addition of flashlamp 18, which is a conventional source of optical pumping energy for the laser rod 1. Also shown, in cross-section, is an internally reflecting elliptical wall 19, within which the laser rod 1 and the flashlamp 18 are mounted, in conventional fashion. The acousto-optic Q-switch 6 is the same as shown in FIG. 1, and the transducer 7 is seen to be mounted on the side of the switch opposite to the side of laser rod 1 on which the flashlamp 18 is placed. We have discovered that propagating the acoustic energy across the acousto-optic Q-switch 6 from the side away from the flashlamp 18, as shown, leads to a significant improvement in the multiple pulse limit of the system. The reason for the improvement has been shown to be that the laser rod 1 is non-uniformly pumped by flashlamp 18, and hence, the population inversion level varies across the laser rod 1. The spatial gradient of the envelope of the acoustic pulse in switch 6 then approximates the distribution of population inversion density in the rod.

The principle may be explained more fully by reference to FIG. 3 of the drawings. Here, an end view of laser rod 1 and the flashlamp 18 is shown. What were the top and bottom of the rod in FIG. 2 are now the left and right, respectively, of the rod 1 in FIG. 3. Superimposed above laser rod 1 is a diagram qualitatively illustrating the variation of lasing threshold as a function of lateral distance across the laser rod 1. Since the population inversion density and the lasing threshold are inversely related to one another, and since the population inversion level is higher at the side of the laser rod 1 facing the flashlamp 18, it is seen that the lasing threshold varies from a minimum near that side, to a maximum on the side of the rod away from the flashlamp 18. This means that it will take less feedback to build up lasing action through the left portion of the laser rod 1 than would be required to cause lasing action on the right side of the rod.

Referring now to FIG. 4 of the drawings, the same threshold curve is shown. At the right of FIG. 4, a representation of the envelope of the acoustical wave propagated through the acousto-optic Q-switch is shown. With the arrangement of the present invention, the acoustic wave will approach from the right side of FIG. 4 toward the left side (bottom to top in FIG. 2). It will be seen from FIG. 4 that the acoustic wave has a significant rise time, which causes the slope of the leading (left side) edge of the wave.

At a time $T_1$, it is seen that the acoustic wave has insufficient amplitude to exceed the threshold at any point across the laser rod. At time $T_2$, the wave has moved further to the left, and is now just about to exceed the threshold at some point in the laser rod. However, since the envelope does not yet exceed the threshold at any point, the situation at $T_2$ may be regarded as a completely "off" Q-switch.

Now consider the envelope of the acoustical wave at time $T_3$. At this time the threshold is exceeded throughout most of the width of the laser rod, and hence lasing action will occur throughout most of the rod. Therefore, what has happened is that the relatively long time it takes for the acoustic wave to traverse a distance equal to the width of the laser rod — approximately one microsecond for a 6 mm. diameter rod, with the acoustic wave being propagated in a quartz Q-switching medium — has had its effective turn-on time reduced to a small fraction of that time. The effective "on" period of the Q-switch is $T_{3-2}$. This interval is much shorter than the full transit time $T_{3-1}$, and can be held to a short duration prohibiting the build-up of a second output pulse.

By contrast, it should be noted that if the acoustic wave is propagated from the opposite direction, i.e., the same side as the flashlamp 18 is located on, the Q-switch would be "on," i.e., a threshold would be exceeded somewhere in the rod, for a time nearly equal to $T_{3-1}$. Accordingly, multiple pulse output would be much more likely.

A practical example will illustrate the significant advantages of this aspect of the invention. Referring again to FIG. 1 of the drawings, if a flashlamp is located below the rod 1, the arrangement will be contrary to the present invention, since the acoustic wave will be propagated from the same side that the flashlamp is on, i.e., the bottom. Laser rod 1 is spaced 12 inches from reflector 2. The distance from laser rod 1 to the acousto-optic Q-switch 6 is 22 inches, and the distance from the Q-switch 6 to the reflector 3 is 1 inch. If the reflectors 2 and 3 are flat mirrors instead of the Porro prisms shown in FIG. 1, and the laser rod is approximately ¼ inch in diameter and pumped over 2.5 inches of length, the following results will typically obtain. With an RF input of 16 watts, and an RF pulse rise time of 40 nanoseconds (from 10 to 90 percent of pulse height), the double-pulse limit is reached at about 10 joules input. The Q-switched output pulse will have an energy of about 60 millijoules.

If a more relaxed rise time of 400 nanoseconds for 10–90 percent RF pulse rise is employed, with 65 watts of RF input, the double-pulse limit is reached at 12 joules input, and a 120 millijoule Q-switched output pulse results.

Now considering the arrangement shown in FIG. 2 of the drawings, illustrating the first aspect of the present invention, the flashlamp 18 is on the opposite side from transducer 7. The relaxed rise time of 400 nanoseconds is employed as before, and a 65-watt RF pulse is used as before; the double-pulse limit is reached at 18.5 joules input, and an output of 220 millijoules. It will be noted that this is an improvement of some 80 percent over operation with the previous transducer orientation. It also represents a many times improvement over the fast-rise-time (40 nanoseconds) operation previously described. The foregoing results are obtained with a laser setup wherein an elliptical cavity is employed, with major axis of 0.82 inches, minor axis of 0.66 inches, and focal points separated by 0.48 inches.

The center to center distance of rod and lamp is 0.40 inches.

In the next aspect of the invention, it has been discovered that, of the various types of reflectors commonly employed in lasers, a certain combination works significantly better, in terms of affording loose angular tolerances for mounting the reflectors.

For the same dimensions of the laser system above described with reference to FIG. 1, wherein the direction of acoustic propagation is nearly vertical, measurements were made to determine the angular tolerance, both horizontally and vertically, for mounting the reflectors 2 and 3. The range, measured in milliradians, was defined as between the points at which the output energy became half of the maximum output energy.

Abbreviations for the various types of reflectors used are:

PV = Porro prism with apex being nearly in the vertical plane (the plane of FIG. 1 of the drawings).
PH = Porro prism with apex in the horizontal plane
CC = Corner cube reflector
F = Flat mirror.

The results are shown in Table 1.

Tolerances of 5 milliradians or less should be considered close tolerances. It will be seen that arrangement No. 4, employing a flat mirror as reflector 2 and a horizontal-apex Porro prism as reflector 3, prevented effective Q-switching entirely, and resulted in long-pulse operation.

In the arrangement No. 8, a corner cube is used as reflector 2 and a vertical-apex Porro prism as reflector 3. In the particular setup employed, the vertical range for the prism was obtained by moving the Porro prism together with the acousto-optic switch, as a single unit. The resulting tolerance was 2 milliradians. It is seen that the arrangement 8 requires only 1 close-tolerance adjustment, that being the vertical adjustment of reflector 3, the Porro prism. All other arrangements are seen to require at least two close-tolerance adjustments. For example, in arrangement 7, wherein a vertical-apex Porro prism was used in a long (41-inch) resonator, the vertical tolerance for reflector 2 and the horizontal tolerance for reflector 3 are both good, i.e., loose; but the horizontal tolerance for reflector 2 and the vertical tolerance for reflector 3 are both close. In the arrangement 8, by comparison, the second-tightest tolerance (15 milliradians) is still three times looser than the second-tightest tolerance (5 milliradians) in arrangement 7.

It is significant to note that the placement of a corner cube at the position of reflector 2 in FIG. 1, would have been expected to produce long-pulse operation, but in fact it does not. The expectation was due to the small angulation of the Porro prism, reflector 3. Referring again to FIG. 1 of the drawings, if the tilting angle for the acousto-optic Q-switch 6 and reflector 3 were small enough, some of the rays parallel to raypath 11 might pass diagonally through the laser rod 1 and strike the corner cube, reflector 2. This would set up a direct path for lasing radiation, even when the Q-switch was off, and hence would lead to long-pulse operation. In fact, however, with the arrangement 8 of Table 1, and the dimensions given above, there was insufficient energy in the direct path to cause lasing action prior to Q-switching.

What is claimed is:
1. An acousto-optically Q-switched laser comprising:
    a. a laser cavity including a lasing medium, first reflecting means mounted substantially perpendicular to the longitudinal axis of said lasing medium and spaced from one end thereof for reflecting radiation from said lasing medium back to said lasing medium, feedback reflecting means spaced from the other end of said lasing medium, and means for optically pumping said lasing medium to produce a non-uniform population inversion density in said lasing medium;
    b. an acousto-optic switch within said laser cavity, said acousto-optic switch being mounted along and tilted at a preselected angle with respect to the longitudinal axis of said lasing medium between said first reflecting means and said feedback reflecting means and being spaced from the other end of said lasing medium for deflecting a portion of the radiation emitted by said lasing medium;
    c. a transducer for introducing acoustic energy into said switch, said transducer being mounted with respect to said switch such that the gradient of the envelope of the acoustic energy introduced into and propagated through said switch approximates the gradient of the non-uniform population inversion directly in said lasing medium; and
    d. said feedback reflecting means being positioned along and tilted at a preselected angle with respect to the longitudinal axis of said lasing medium related to the path to be taken by the deflected portion of radiation for reflecting said deflected portion of radiation back to said switch.
2. The laser of claim 1 wherein:
    a. said feedback reflecting means is a Porro prism having its apex substantially parallel to the direction of propagation of said acoustic energy; and
    b. said first reflecting means is a Porro prism having its apex substantially perpendicular to the direction of propagation of said acoustic energy.
3. The laser of claim 1, wherein:
    a. said first reflecting means is a corner cube retroreflector; and
    b. said feedback reflecting means is a Porro prism having its apex substantially parallel to the direction of propagation of said acoustic energy.
4. An acousto-optically Q-switched laser comprising:
    a. a laser cavity including a lasing medium, first reflecting means mounted substantially perpendicular to the longitudinal axis of said lasing medium and spaced from one end thereof for reflecting radiation from said lasing medium back to said lasing medium, feedback reflecting means spaced from the other end of said lasing medium, and means for optically pumping said lasing medium disposed on one side thereof;
    b. an acousto-optic switch within said laser cavity, said acousto-optic switch being mounted along and tilted at a preselected angle with respect to the longitudinal axis of said lasing medium between said first reflecting means and said feedback reflecting means and being spaced from the other end of said lasing medium for deflecting a portion of the radiation emitted by said lasing medium;
    c. a transducer source of acoustic energy for introducing acoustic energy into said switch, said transducer source being mounted on the side of said switch corresponding to the opposite side of said lasing medium from said optical pumping means so as to dispose said transducer source remotely with respect to said optical pumping means; and d. said feedback reflecting means being positioned along and tilted at a preselected angle with respect to the longitudinal axis of said lasing medium related to the path to be taken by the deflected portion of radiation for reflecting said deflected portion of radiation back to said switch.

5. The laser of claim 4 wherein:
a. said feedback reflecting means is a Porro prism having its apex substantially parallel to the direction of propagation of said acoustic energy; and
b. said first reflecting means is a Porro prism having its apex substantially perpendicular to the direction of propagation of said acoustic energy.

6. The laser of claim 4, wherein:
a. said first reflecting means is a corner cube retroreflector; and
b. said feedback reflecting means is a Porro prism having its apex substantially parallel to the direction of propagation of said acoustic energy.

7. An acousto-optically Q-switched laser comprising:
a. a laser cavity including a lasing medium, means for optically pumping said lasing medium, and first and second reflecting means between which said lasing medium is disposed;
b. said first reflecting means comprising a corner-cube retroreflector mounted substantially perpendicular to the longitudinal axis of said lasing medium and spaced from one end thereof for reflecting radiation from said lasing medium back to said lasing medium;
c. an acousto-optic switch within said laser cavity, said acousto-optic switch being mounted along the longitudinal axis of said lasing medium and spaced from the other end thereof for deflecting a portion of radiation emitted by said lasing medium;
d. means for introducing acoustic energy into said switch; and
e. said second reflecting means comprising a Porro prism retroreflector mounted on the side of said switch away from said lasing medium for reflecting said deflected portion of radiation back to said switch, the apex of said Porro prism lying substantially parallel to the direction of propagation of said acoustic energy.

8. An acousto-optically Q-switched laser comprising:
a. a laser cavity including a lasing medium in the form of an elongated laser rod, first reflecting means mounted substantially perpendicular to the longitudinal axis of said laser rod and spaced from one end thereof for reflecting radiation from said laser rod back to said laser rod, feedback reflecting means spaced from the other end of said laser rod, and means for optically pumping said laser rod to produce a non-uniform population inversion density in said laser rod, said optical pumping means comprising an elongated rod-like flashlamp disposed on one side of said laser rod in spaced substantially parallel relationship with respect thereto;
b. an acousto-optic switch within said laser cavity, said acousto-optic switch being mounted along and tilted at a preselected angle with respect to the longitudinal axis of said laser rod between said first reflecting means and said feedback reflecting means and being spaced from the other end of said laser rod for deflecting a portion of the radiation emitted by said laser rod;
c. a transducer source of acoustic energy for introducing acoustic energy into said switch, said transducer source being mounted on the side of said switch corresponding to the opposite side of said laser rod from said elongated rod-like flashlamp so as to dispose said transducer source with respect to said switch such that the gradient of the envelope of the acoustic energy introduced into and propagated through said switch approximates the gradient of the non-uniform population inversion density in said laser rod produced by activation of said elongated rod-like flashlamp; and
d. said feedback reflecting means being positioned along and tilted at a preselected angle with respect to the longitudinal axis of said laser rod related to the path to be taken by the deflected portion of radiation for reflecting said deflected portion of radiation back to said switch.

* * * * *